United States Patent
Martin

(10) Patent No.: US 9,242,739 B2
(45) Date of Patent: Jan. 26, 2016

(54) METHODS TO MONITOR COMPONENTS OF AN AIRCRAFT LANDING SYSTEM

(71) Applicant: The Boeing Company, Chicago, IL (US)

(72) Inventor: Casandra Jolene Martin, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 36 days.

(21) Appl. No.: 14/088,087

(22) Filed: Nov. 22, 2013

(65) Prior Publication Data

US 2015/0145703 A1    May 28, 2015

(51) Int. Cl.
| | |
|---|---|
| *G08B 21/00* | (2006.01) |
| *B64D 45/00* | (2006.01) |
| *B60T 8/17* | (2006.01) |
| *B60T 17/22* | (2006.01) |
| *G01K 7/42* | (2006.01) |
| *F16D 66/00* | (2006.01) |

(52) U.S. Cl.
CPC .............. *B64D 45/00* (2013.01); *B60T 8/1703* (2013.01); *B60T 17/221* (2013.01); *F16D 66/00* (2013.01); *G01K 7/42* (2013.01); *F16D 2066/001* (2013.01)

(58) Field of Classification Search
CPC ..... B60T 8/1703; B60T 17/22; B60T 17/221; F16D 2066/001
USPC ............. 340/960, 449; 303/122.03, 126, 191; 701/70
See application file for complete search history.

(56) References Cited

U.S. PATENT DOCUMENTS

| | | | |
|---|---|---|---|
| 3,454,925 A * | 7/1969 | Ruof ............................. 340/449 |
| 3,582,926 A * | 6/1971 | Hassan ......................... 340/449 |
| 7,086,503 B2 * | 8/2006 | Miller et al. ............. 303/122.03 |
| 7,497,305 B2 * | 3/2009 | Miller et al. ............. 303/122.03 |
| 7,506,941 B2 * | 3/2009 | Miller et al. .................. 303/191 |
| 7,901,014 B2 * | 3/2011 | Miller et al. .................. 303/191 |
| 8,151,944 B2 | 4/2012 | Waltz |
| 8,152,246 B2 * | 4/2012 | Miller et al. .................. 303/191 |
| 2002/0104717 A1 | 8/2002 | Borugian |
| 2002/0195298 A1 | 12/2002 | Borugian |
| 2012/0193484 A1 | 8/2012 | Furtwängler et al. |

(Continued)

FOREIGN PATENT DOCUMENTS

| | | |
|---|---|---|
| DE | 102010044899 | 3/2011 |
| EP | 2060456 | 5/2009 |
| FR | 2534193 | 4/1984 |

OTHER PUBLICATIONS

Rob Root, "Brake Energy Considerations in Flight Operations", Sep. 2003, 69 pages, USA.

(Continued)

*Primary Examiner* — John A Tweel, Jr.
(74) *Attorney, Agent, or Firm* — Hanley, Flight & Zimmerman, LLC.

(57) ABSTRACT

Methods to monitor components of an aircraft landing system are disclosed herein. An example method includes determining a brake assembly temperature and determining a wheel temperature. The example method also includes retrieving an estimated increase in the wheel temperature from a data structure based on the wheel temperature and the brake assembly temperature. The example method further includes determining a maximum wheel temperature based on the wheel temperature and the estimated increase in the wheel temperature.

20 Claims, 12 Drawing Sheets

(56) References Cited

U.S. PATENT DOCUMENTS

2012/0197505 A1    8/2012  Friesen et al.
2014/0239121 A1*   8/2014  Kirkbride et al. ......... 244/103 R

OTHER PUBLICATIONS

European Patent Office, "Search Report," issued in connection with the European application No. 14194486, on Apr. 8, 2015 (5 pages).

* cited by examiner

700

| FIRST WHEEL TEMPERATURE RANGE: WHEEL TEMPERATURE < $T_1$ | | SECOND WHEEL TEMPERATURE RANGE: $T_1$ < WHEEL TEMPERATURE < $T_2$ | | THIRD WHEEL TEMPERATURE RANGE: WHEEL TEMPERATURE > $T_2$ | |
|---|---|---|---|---|---|
| BRAKE TEMPERATURE RANGE | ESTIMATED WHEEL TEMEPRATURE INCREASE | BRAKE TEMPERATURE RANGE | ESTIMATED WHEEL TEMEPRATURE INCREASE | BRAKE TEMPERATURE RANGE | ESTIMATED WHEEL TEMEPRATURE INCREASE |
| < BTMS 4 | 0 | < BTMS 4 | 0 | < BTMS 4 | 0 |
| BTMS 4 – BTMS 4.9 | $\Delta T_1$ | BTMS 4 – BTMS 4.9 | $\Delta T_5$ | BTMS 4 – BTMS 4.9 | $\Delta T_9$ |
| BTMS 5 – BTMS 5.9 | $\Delta T_2$ | BTMS 5 – BTMS 5.9 | $\Delta T_6$ | BTMS 5 – BTMS 5.9 | $\Delta T_{10}$ |
| BTMS 6 – BTMS 6.9 | $\Delta T_3$ | BTMS 6 – BTMS 6.9 | $\Delta T_7$ | BTMS 6 – BTMS 7.9 | $\Delta T_{11}$ |
| BTMS 7 – 9.9 | $\Delta T_4$ | BTMS 7 – 9.9 | $\Delta T_8$ | BTMS 7 – 9.9 | $\Delta T_{12}$ |

FIG. 7

METHODS TO MONITOR COMPONENTS OF AN AIRCRAFT LANDING SYSTEM

FIELD

The present disclosure relates generally to aircraft landing systems and, more particularly, to methods to monitor components of an aircraft landing system.

BACKGROUND

Generally, an aircraft includes wheels and brakes to facilitate taxiing, landing, parking, etc. When the brakes are operated, the brakes generate heat. The heat from the brakes may be transferred to the wheels. Generally, each of the wheels includes one or more fuse plugs. A fuse plug may include a seal, which melts upon reaching a threshold temperature to release air from a tire on the wheel. Conventional brake temperature monitoring systems utilize only brake temperature measurements, which may not correlate to wheel temperatures in most instances due to heat shielding. These conventional systems also do not address a concern among operators of triggering wheel fuse plugs due to exceeding predetermined temperature thresholds of a wheel. As a result, an operator may subject themselves to overly conservative delay periods to compensate for insufficient data regarding actual wheel temperature. It would therefore be beneficial to provide an enhanced measurement of an existing wheel temperature and predict a future wheel temperature given a particular delay period and eventual landing.

SUMMARY

An example method includes determining a first temperature of a wheel of an aircraft, and determining a second temperature of a brake assembly operatively coupled to the wheel. The example method further includes associating the first temperature with one of a plurality of predetermined ranges of wheel temperatures, and associating the second temperature with one of a plurality of predetermined ranges of brake assembly temperatures. The example method also includes determining an estimated increase in the first temperature associated with the one of the ranges of wheel temperatures and the one of the ranges of brake assembly temperatures. The example method also includes determining a maximum temperature of the wheel based on the first temperature and the estimated increase in the first temperature.

Another example method includes determining a brake assembly temperature and determining a wheel temperature. The example method also includes retrieving an estimated increase in the wheel temperature from a data structure based on the wheel temperature and the brake assembly temperature. The example method further includes determining a maximum wheel temperature based on the wheel temperature and the estimated increase in the wheel temperature.

An example method disclosed herein includes determining a brake assembly temperature and determining a wheel temperature. The example method also includes determining if a fuse plug disposed on a wheel is at risk of melting based on the brake assembly temperature, the wheel temperature, and estimated heating patterns of the wheel.

The features, functions and advantages that have been discussed can be achieved independently in various examples or may be combined in yet other examples further details of which can be seen with reference to the following description and drawings.

BRIEF DESCRIPTION OF THE DRAWINGS

FIG. 7 is an example data structure, which may be used to determine an estimated increase in a temperature of a wheel of the example aircraft landing system of FIGS. 1-2.

Figure 1:
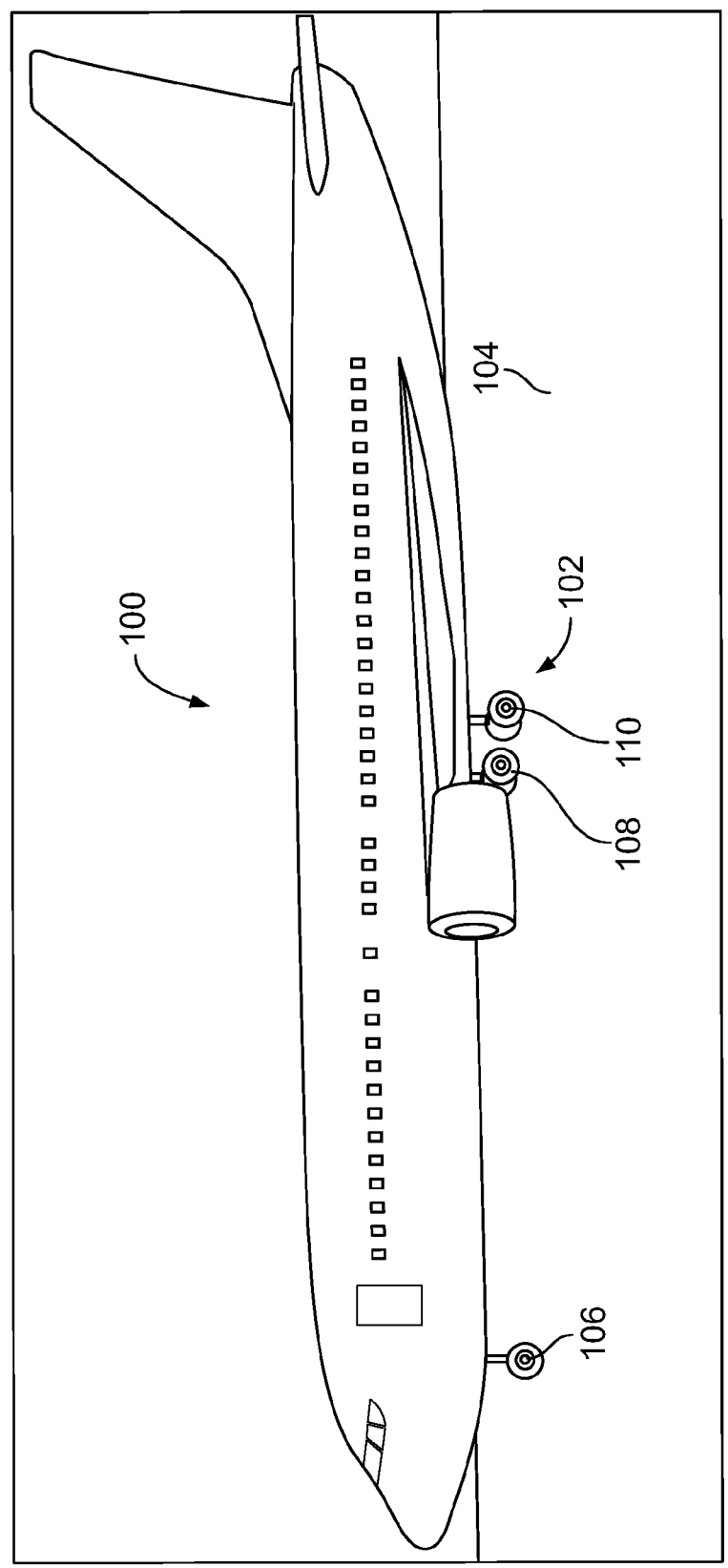
FIG. 1 illustrates an example aircraft that may be used to implement example methods disclosed herein.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Methods to monitor components of an aircraft landing system are disclosed herein. During a braking event of an aircraft such as, for example, landing, taxiing, parking, etc., heat is generated by components (e.g., rotors and stators) of a brake assembly. Heat is transferred from the brake assembly to a wheel operatively coupled to the brake assembly. The wheel may include a fuse plug, which includes a seal that melts at a threshold temperature. If the seal melts, air is released from a tire on the wheel. After one braking event or a plurality of braking events in a given period of time, a temperature of the fuse plug may increase toward the threshold temperature. The examples disclosed herein may be used to monitor a temperature of the brake assembly and/or the wheel to enable an operator of the aircraft, an aircraft control system, etc. to determine when to schedule future braking events (e.g., landing at a destination) or perform one or more actions to cool the brake assembly and/or the wheel to prevent the fuse plug from melting.

Heat from the brake assembly may be transferred to the fuse plug during the braking event (e.g., as the brakes are applied during landing) and after the braking event (e.g., during taxiing, once the aircraft is parked, etc.). Thus, a temperature of the fuse plug may continue to increase following the braking event. In some examples, a fuse plug monitoring system includes a temperature monitoring unit in communication with a first temperature sensor disposed on the wheel and a second temperature sensor disposed on the brake assembly. The first temperature sensor is used to determine wheel temperatures, and the second temperature sensor is used to determine brake assembly temperatures. In some examples, the temperature monitoring unit determines an estimated maximum temperature of the wheel and/or the fuse plug based on experimentally determined data associated with a wheel temperature and a brake assembly temperature. In some examples, the estimated maximum temperature of the wheel and/or the fuse plug is an estimated future temperature of the wheel and/or the fuse plug. In some examples, the temperature monitoring unit retrieves an estimated increase in wheel temperature from a data structure such as, for example, a table to determine the estimated maximum wheel temperature.

FIG. 1 illustrates an example aircraft 100, which may be used to implement methods to monitor components of an aircraft landing system disclosed herein. In the illustrated example, the aircraft 100 includes a landing system 102 to support the aircraft 100 on a surface 104 (e.g., a runway) and enable the aircraft 100 to taxi, take off, land, etc. The example landing system 102 includes a front landing gear unit 106 and two rear landing gear units 108 and 110. However, the above-noted numbers of front and rear landing units are merely examples and, thus, other examples may employ other numbers of front landing gear units and/or rear landing gear units without departing from the scope of this disclosure.

To travel from one destination (e.g., airport) to another, the example aircraft 100 may perform a plurality of braking events such as, for example, taxiing from a departure gate to a runway, landing, taxiing from a runway to an arrival gate, and parking. During a given time period (e.g., one day), the example aircraft 100 may travel or be scheduled to travel to a plurality of destinations and, thus, perform or be scheduled to perform a plurality of braking events.

Figure 2:
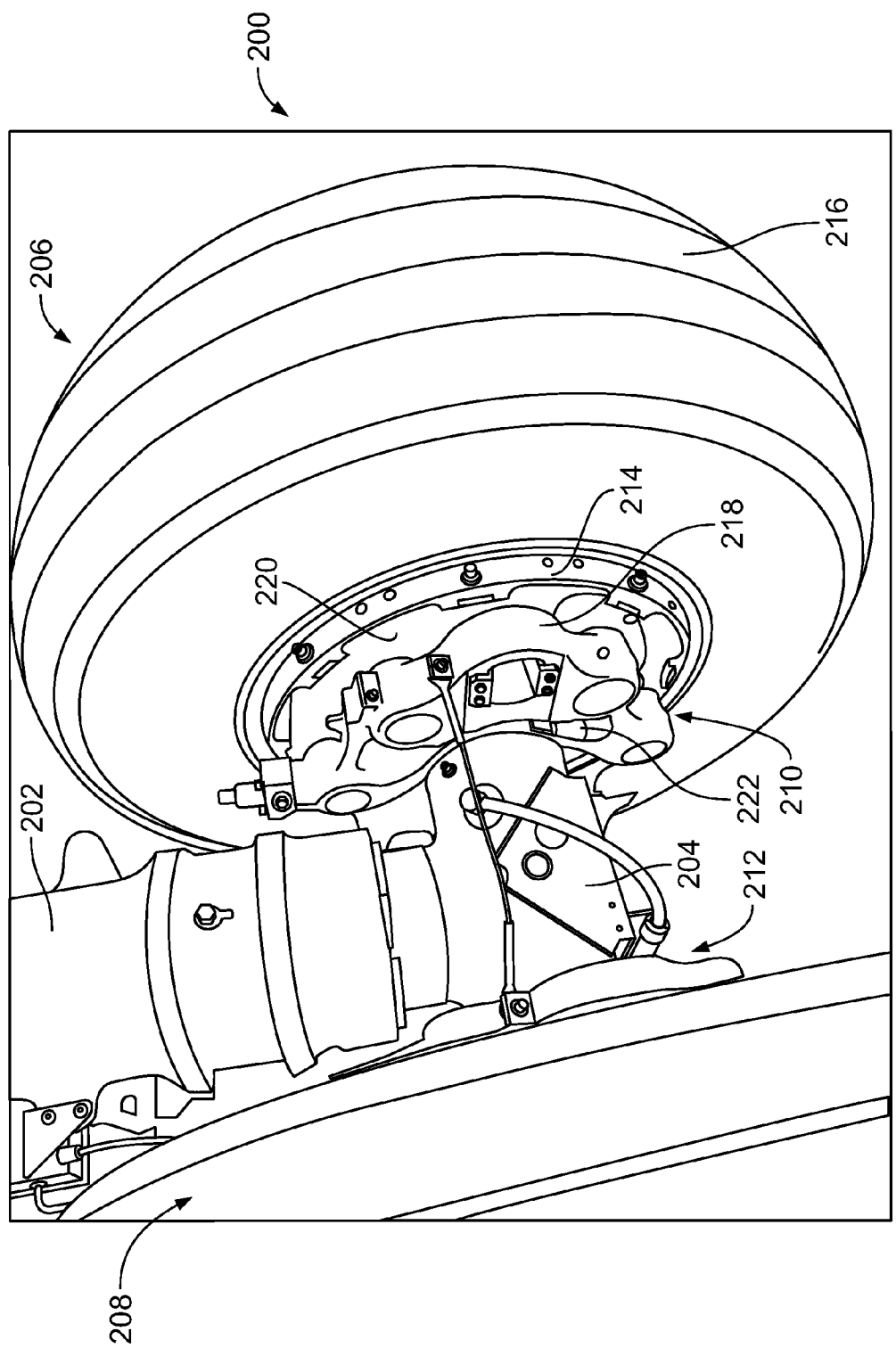
FIG. 2 illustrates an example aircraft landing system of the aircraft of FIG. 1.

FIG. 2 illustrates an example landing gear unit 200, which may be used to implement the landing system 102 of the example aircraft 100 of FIG. 1. In the illustrated example, the landing gear unit 200 includes a strut 202, an axle assembly 204, two wheel assemblies 206 and 208, and two brake assemblies 210 and 212. Each of the brake assemblies 210 and 212 is coupled to the axle assembly 204 and a respective one of the wheel assemblies 206 and 208. The example landing gear unit 200 may include a plurality of actuators, sensors and/or other devices, which may be controlled by and/or communicate with one or more aircraft control systems of the example aircraft 100.

The wheel assemblies 206 and 208 of the example landing gear unit 200 are substantially similar, and the brake assemblies 210 and 212 of the example landing gear unit 200 are substantially similar. Thus, the following description of the brake assembly 210 and the wheel assembly 206 disposed on a right side of the strut 202 in the orientation of FIG. 2 is applicable to the brake assembly 212 and the wheel assembly 208 disposed on a left side of the strut 202 in the orientation of FIG. 2. Therefore, to avoid redundancy, the wheel assembly 208 and the brake assembly 212 on the left side of the strut 202 in the orientation of FIG. 2 are not separately described.

In the illustrated example, wheel assembly 206 includes a wheel 214 and a tire 216. The example brake assembly 210 includes a housing 218, brakes (e.g., one or more rotors and stators), pistons and/or other components. In the illustrated example, the brakes are received in a tubewell 220 of the wheel 214. When the brake assembly 210 is operated, the brakes convert kinetic energy of the wheel 214 into brake energy (e.g., heat energy). As a result, a temperature of the brake assembly 210 increases. In the illustrated example, a brake temperature sensor 222 (e.g., a thermocouple) is coupled to the landing gear unit 200 to acquire information related to the temperature of the brake assembly 210 ("brake temperature information"). The example brake temperature sensor 222 of FIG. 2 is disposed on the housing 218 of the brake assembly 210. In other examples, the brake temperature sensor 222 may be coupled to other components of the brake assembly 210, the axle assembly 204, the strut 202, the wheel 214, and/or any other suitable component of the landing gear unit 200. As described in greater detail below, the temperature of the brake assembly 210 may be used to estimate an increase in temperature of the wheel 214 as a result of a braking event.

Figure 3:
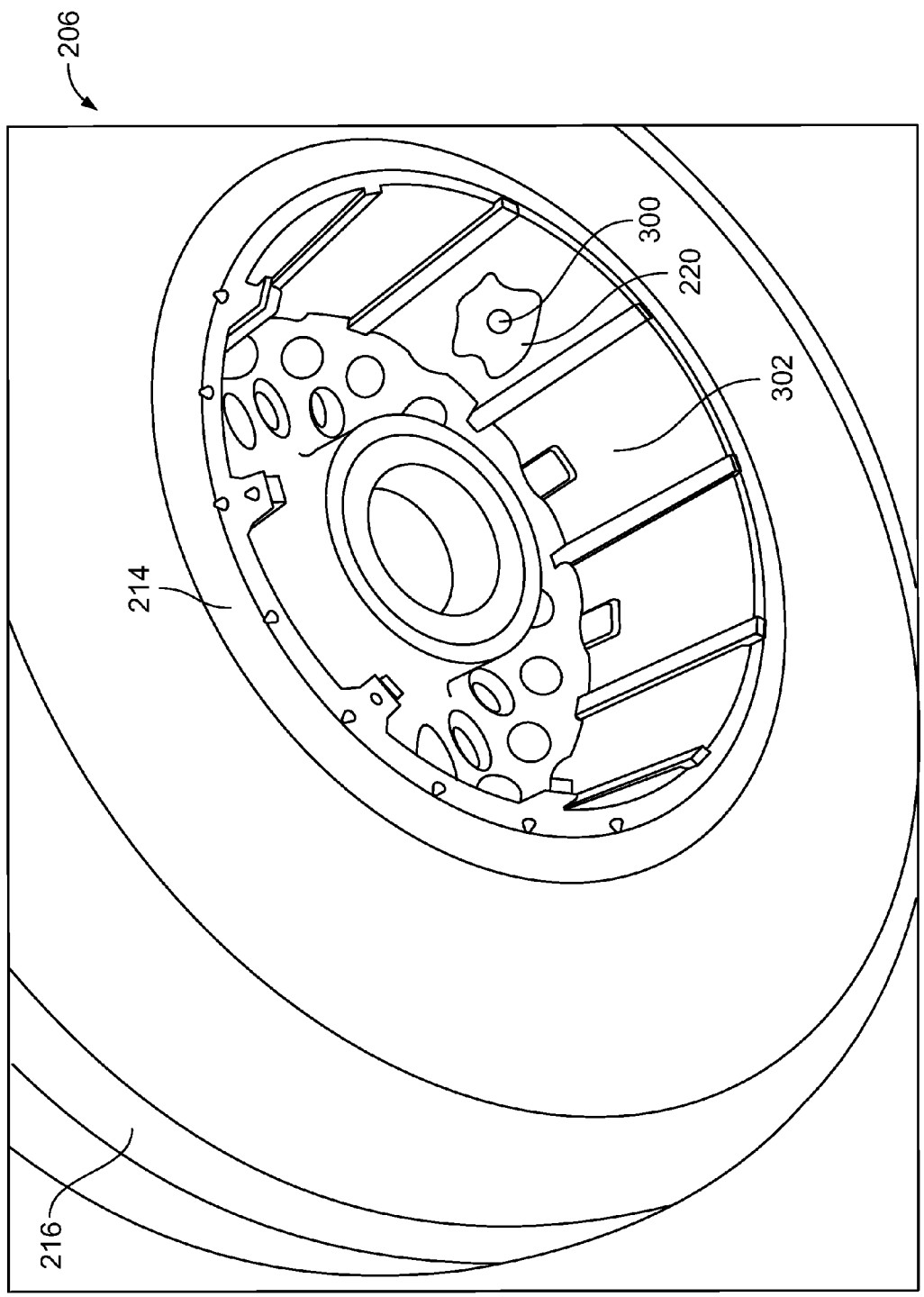
FIG. 3 illustrates an example wheel assembly of the aircraft landing system of FIG. 2.

FIG. 3 is a view of a first side of the example wheel assembly 206 of FIG. 2. In the illustrated example, the wheel 214 includes an example fuse plug 300. The example fuse plug 300 is coupled to the wheel 214 via the tubewell 220. Although one fuse plug is shown in the illustrated example, the wheel 214 may include a plurality of fuse plugs, which may be spaced apart along the wheel 214 (e.g., three fuse plugs radially spaced apart by about 120 degrees).

The example fuse plug 300 of FIG. 3 is in communication with the interior space of the tire 216 between the wheel 214 and the tire 216. When a temperature of the fuse plug 300 is below a threshold temperature, the fuse plug 300 enables the tire 216 to be inflated and/or pressurized. If the temperature of the fuse plug 300 reaches or exceeds the threshold temperature, a portion (e.g., a eutectic core) of the fuse plug 300 melts to release air from in the tire 216.

The example wheel assembly 206 includes a heat shield 302 coupled to the wheel 214. The example heat shield 302 is disposed between the brake assembly 210 and the wheel 214 to prevent and/or mitigate convective and/or radiative heat transfer from the brake assembly 210 to the wheel 214 and the fuse plug 300.

Figure 4:
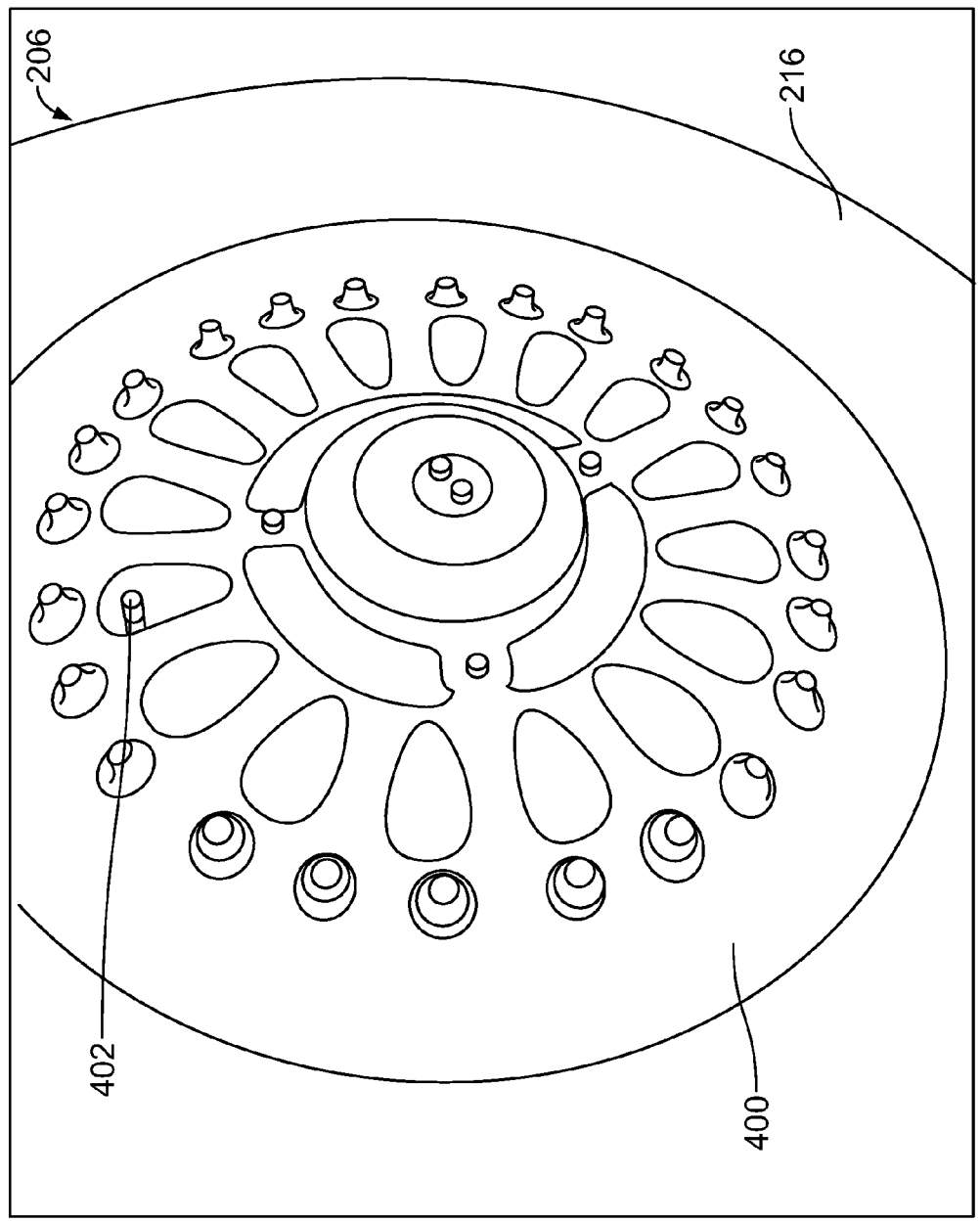
FIG. 4 illustrates a tire inflation valve disposed on the example wheel assembly of FIG. 3.

FIG. 4 is a view of a second side of the example wheel assembly 206 of FIGS. 2-3. In the illustrated example, the wheel assembly 206 includes a cap 400 coupled to the wheel 214. The wheel assembly 206 also includes a tire inflation valve 402. Air may be flowed into the tire 216 via the tire inflation valve 402 to inflate the tire 216 and/or pressurize the tire 216.

Figure 5:
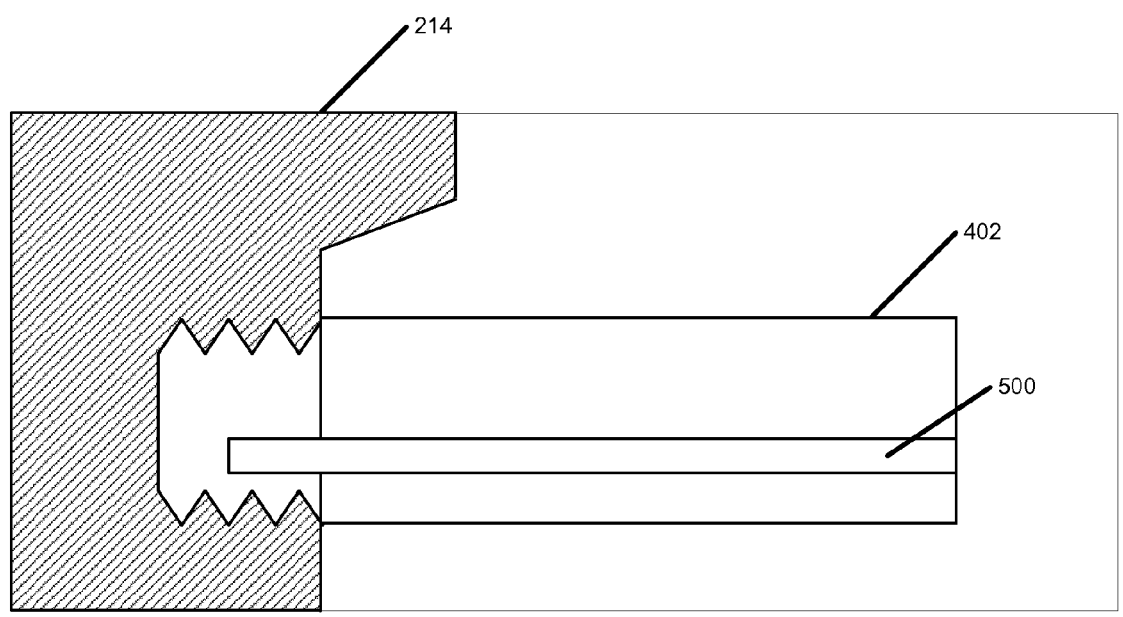
FIG. 5 is a cross-sectional view of the example tire inflation valve of FIG. 4.

FIG. 5 is a cross-sectional view of the example wheel 214 and the example tire inflation valve 402 of FIG. 4. In the illustrated example, a wheel temperature sensor 500 (e.g., a thermocouple) is disposed in the tire inflation valve 402. In other examples, the wheel temperature sensor 500 is disposed in and/or on other portions of the wheel assembly 206 (e.g., the cap 400, the tubewell 220 of the wheel 214, a rim of the wheel 214, etc.). The wheel temperature sensor 500 acquires information related to a temperature of the wheel 214 ("wheel temperature information"). As described in greater detail below, the temperature of the wheel 214 and the temperature of the brake assembly 210 may be used to estimate a maximum temperature of the wheel 214 as a result of a braking event.

Figure 6:
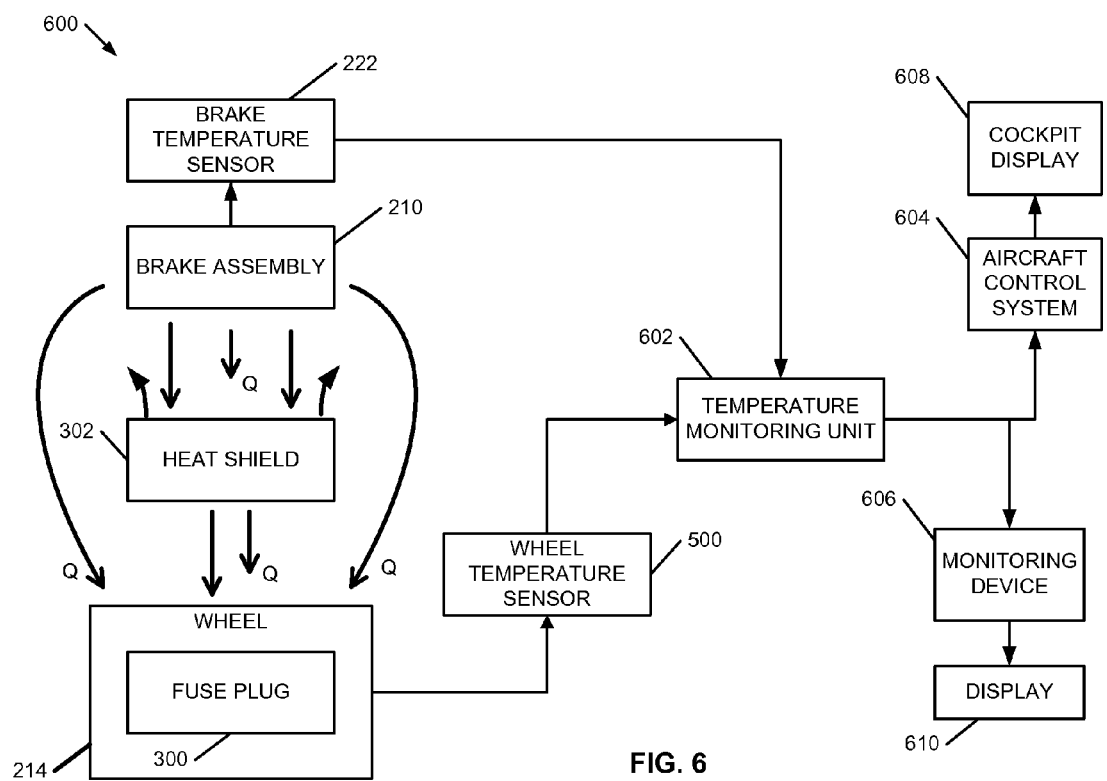
FIG. 6 is a block diagram of an example fuse plug monitoring system including an example temperature monitoring unit.

FIG. 6 is a block diagram of an example fuse plug monitoring system 600 disclosed herein. The example fuse plug monitoring system 600 includes a temperature monitoring unit 602 in communication with the brake temperature sensor 222 and the wheel temperature sensor 500. The example temperature monitoring unit 602 monitors temperatures of the wheel 214 ("wheel temperatures") and temperatures of the brake assembly 210 ("brake assembly temperatures"). As described in greater detail below in conjunction with FIG. 7, in some examples, the temperature monitoring unit 602 determines estimated maximum temperatures of the wheel 214 resulting from one or more braking events performed by the example aircraft 100 based on the wheel temperatures and/or the brake assembly temperatures.

The temperature monitoring unit 602 may be implemented by and/or in communication with an aircraft control system 604 disposed on the aircraft 100 or a monitoring device 606 disposed outside of the aircraft 100 (e.g., a portable or handheld device (e.g., a laptop, a smartphone, a portable diagnostic tool, etc.)), a workstation (e.g., located in a maintenance facility, a ground control facility, etc.), and/or any other suitable device and/or system. The example temperature monitoring unit 602 may operate while the aircraft 100 is on the surface 104 of Earth and/or in flight.

During operation of the example aircraft 100, the wheel temperature sensor 500 communicates the wheel temperature information to the temperature monitoring unit 602. Based on the wheel temperature information, the temperature monitoring unit 602 determines one or more wheel temperatures.

During a braking event, kinetic energy is converted into brake energy via the brake assembly 210. As a result, heat Q is generated by the brake assembly 210. The heat Q may be transferred from the brake assembly 210 to the axle assembly 204, the heat shield 302, the wheel 214, the fuse plug 300, and/or other components of the landing gear unit 200. As a result, a temperature of the wheel 214 and/or a temperature of the fuse plug 300 may increase during the braking event. After the braking event has concluded (e.g., upon takeoff, once the aircraft 100 is parked, etc.), the wheel 214 and the fuse plug 300 may continue to absorb heat energy generated by the brake assembly 210. As a result, the temperatures of the wheel 214 and the fuse plug 300 may increase until a given amount of time after the braking event has concluded.

The example brake temperature sensor 222 communicates brake assembly temperature information to the temperature monitoring unit 602. In some examples, based on the brake temperature information, the temperature monitoring unit 602 determines a temperature of the brake assembly 210. Based on the temperature of the brake assembly 210 and the temperature of the wheel 214, the temperature monitoring unit 602 determines an estimated temperature increase of the wheel 214 over a predetermined amount of time (e.g., fifteen minutes). Based on the temperature of the wheel 214 and the estimated wheel temperature increase, the temperature monitoring unit 602 estimates a maximum temperature of the wheel 214 during the predetermined amount of time.

Based on the maximum wheel temperature, the temperature monitoring unit 602 may generate and/or communicate an alert. In some examples, the alert may indicate that the temperature of the fuse plug 300 has or will exceed the fuse plug melting temperature and, thus, is at risk of melting. In some examples, the alert is generated by illuminating a light via a cockpit display 608. In some examples, the message is displayed via the cockpit display 608, a display 610 of the monitoring device 606, and/or any other suitable display.

In some examples, the temperature monitoring unit 602 communicates the message if the estimated maximum wheel temperature is greater than a predetermined threshold temperature such as, for example, 340 degrees Fahrenheit. In some examples, the predetermined threshold temperature takes into account factors and/or conditions related to the wheel assembly 206 and/or, more specifically, the fuse plug 300 to enable the wheel temperature to be used by the example temperature monitoring unit 602 to detect if one or more past or future braking events risk melting the fuse plug 300. In some examples, the predetermined threshold temperature is based on an estimated melting temperature of the fuse plug 300, a position of the fuse plug 300 relative to the wheel temperature sensor 500, and/or other conditions and/or factors. In some examples, the predetermined threshold temperature is expressed as follows:

$$T_{threshold} = T_{melting} - T_{melting\ temperature\ factor} - T_{position\ factor} - T_{wheel\ temperature\ factor}.$$

Equation 1:

In Equation 1, $T_{melting}$ is a temperature at which the example fuse plug 300 is to melt. $T_{melting\ temperature\ factor}$ is a fuse plug melting temperature tolerance factor equal to, for example, a number of degrees less than the estimated melting temperature at which the fuse plug 300 may melt. For example, if the fuse plug 300 is to melt at 390 degrees Fahrenheit but experimental data and/or testing indicates that the fuse plug 300 may melt at temperatures as low as 370 degrees, the fuse plug melting temperature tolerance factor may be twenty degrees (390−370=20). $T_{position\ factor}$ is a fuse plug position factor that is equal to an estimated maximum difference in temperature between the wheel temperature measured via the wheel temperature sensor 500 and a temperature of fuse plug 300 as a result of a radial position of the fuse plug 300 relative to the wheel temperature sensor 500. For example, because heat Q generally rises, if the fuse plug 300 is disposed above the wheel temperature sensor 500 relative to the surface 104 of Earth, the temperature of the fuse plug 300 may be greater than a temperature of the wheel 214 determined via the wheel temperature sensor 500. If the fuse plug 300 is disposed below the wheel temperature sensor 500 relative to the surface 104 of Earth, the temperature of the fuse plug 300 may be less than the temperature of the wheel 214 determined via the wheel temperature sensor 500. In some examples, the fuse plug position factor is determined based on the estimated difference in temperature between the wheel temperature measured via the wheel temperature sensor 500 and the fuse plug temperature when the fuse plug 300 is at a highest point on the wheel 214 relative to the surface 104 of Earth.

$T_{wheel\ temperature\ factor}$ is a wheel temperature tolerance factor equal to an estimated difference between the wheel temperature measured by the wheel temperature sensor 500 and a temperature of the fuse plug 300 as a result of variations in temperature of the wheel 214 and/or relative proximities of the fuse plug 300 and the wheel temperature sensor 500 to the brake assembly 210. For example, because the example fuse plug 300 is disposed closer to the example brake assembly 210 than the wheel temperature sensor 500, the fuse plug temperature may be higher than the wheel temperature measured via the wheel temperature sensor 500. In some examples, because the predetermined threshold temperature takes into account some or all of the foregoing factors and/or conditions, the temperature monitoring unit 602 may determine if the fuse plug 300 is at risk of melting independent of a state of wear of the brake assembly 210.

FIG. 7 illustrates an example data structure 700, which may be used by the temperature monitoring unit 602 to determine the estimated maximum wheel temperature. The example data structure 700 of FIG. 7 is a table. In other examples, other data structures may be used. In the illustrated example, the temperature monitoring unit 602 employs the example table 700 if the brake assembly temperature is increasing and/or greater than a predetermined brake assembly temperature such as, for example, 500 degrees Fahrenheit. If the brake assembly temperature is increasing and/or greater than the predetermined brake assembly temperature, the temperature monitoring unit 602 retrieves an estimated increase in the wheel temperature (e.g., $0-\Delta T_{12}$) from the table 700 based on the wheel temperature and the brake assembly temperature.

Based on the wheel temperature and the estimated increase in the wheel temperature, the temperature monitoring unit 602 determines the estimated maximum wheel temperature. For example, the temperature monitoring unit 602 adds the estimated increase in the wheel temperature to the wheel temperature to determine the estimated maximum wheel temperature.

The example table 700 of FIG. 7 is organized based on estimated heating patterns of the wheel 214. In the illustrated example, the estimated heating patterns are based on experimentally determined heating patterns of one or more wheels similar or identical to the example wheel 214. In the illustrated example, the table 700 is organized using three predetermined wheel temperature ranges. In the illustrated example, a first predetermined wheel temperature range is less than a first temperature $T_1$. An example second predetermined wheel temperature range of the example table 700 is between the first temperature $T_1$ and a second temperature $T_2$. An example third predetermined wheel temperature range of the example table 700 is greater than the second temperature $T_2$. In other examples, the data structure 700 is organized using other numbers of predetermined wheel temperature ranges and/or in other ways.

The estimated heating patterns are used to determine if the fuse plug 300 is at risk of melting. For example, if the wheel temperature is within the first predetermined wheel temperature range (e.g., less than the first temperature $T_1$), the wheel 214 may increase in temperature according to a first function or heating curve during a braking event. If the wheel temperature is within the second predetermined wheel temperature range (e.g., between the first temperature $T_1$ and the second temperature $T_2$), the wheel 214 may increase in temperature according to a second function or heating curve during a braking event. For example, the wheel 214 may increase in temperature at a greater rate if the wheel temperature is within the first predetermined temperature range than if the wheel temperature is within the second predetermined temperature range. In some examples, if the wheel 214 has a wheel temperature within the third predetermined temperature range, the wheel 214 increases in temperature according to a third function or heating curve during a braking event.

In some examples, the heating patterns of the wheel 214 are influenced by the brake assembly temperature. Thus, an increase in temperature of the wheel may be a function of the brake assembly temperature as well as the wheel temperature. In the illustrated example, the example table 700 includes estimated increases in the wheel temperature (e.g., $0-\Delta T_{12}$) that are each paired or associated with one of the predetermined wheel temperature ranges and one of the predetermined brake assembly temperature ranges. In some examples, the estimated wheel temperature increases are determined experimentally by, for example, acquiring data by monitoring temperatures of wheels and/or brake assemblies of one or more aircrafts substantially similar to the example aircraft 100 during a plurality of braking events.

In the illustrated example, the brake assembly temperature ranges are in Brake Temperature Management System (BTMS) scaling, which is unitless. The example brake assembly temperature ranges of the example table 700 of FIG. 7 are less than BTMS 4, BTMS 4-4.9, BTMS 5-5.9, BTMS 6-6.9, and BTMS 7-9.9. In other examples, the brake assembly temperature ranges employ other types of scaling and/or are other ranges. In some examples, the brake assembly temperature ranges are not scaled.

The example temperature monitoring unit 602 determines which estimated increase in the wheel temperature to retrieve from the table 700 by determining which one of the wheel temperature ranges and which one of the brake temperature ranges include the wheel temperature determined via the wheel temperature sensor 500 and the brake assembly temperature determined via the brake temperature sensor 222, respectively. For example, when the temperature monitoring unit 602 determines the wheel temperature and the brake assembly temperature, the temperature monitoring unit 602 determines if the wheel temperature is within the first predetermined wheel temperature range, the second predetermined wheel temperature range or the third predetermined wheel temperature range. If, for example, the wheel temperature is within the second predetermined wheel temperature range, the temperature monitoring unit 602 determines which one of the brake assembly temperature ranges associated with the second predetermined wheel temperature range includes the brake assembly temperature. For example, if the brake assembly temperature is BTMS 5.5, the temperature monitoring unit 602 determines that BTMS 5-5.9 includes BTMS 5.5. In the illustrated example, the temperature monitoring unit 602 then retrieves the estimated wheel temperature increase associated or paired with BTMS 5-5.9. In the illustrated example, the estimated wheel temperature increase associated with BTMS 5-5.9 is represented in the example table 700 of FIG. 7 as $\Delta T_6$.

In some examples, the temperature monitoring unit 602 adds the estimated wheel temperature increase to the wheel temperature to determine an estimated maximum wheel temperature. In some examples, the estimated maximum wheel temperature is an estimated maximum wheel temperature at a future time such as, for example, fifteen minutes after the wheel temperature is determined. If the maximum wheel temperature is greater than the predetermined threshold temperature, the temperature monitoring system 602 communicates a message or alert indicating that the fuse plug 300 may melt.

During some braking events, the brake assembly temperature does not substantially increase, but sufficient heat is transferred to the wheel 214 to melt the fuse plug 300. For example, an extended period of light braking during taxiing may not increase the brake assembly temperature above 500 degrees, but sufficient heat may transfer to the wheel 214 to melt the fuse plug 300. Thus, in some examples, the temperature monitoring unit 602 does not use the example table 700 if the brake assembly temperature is below the predetermined brake assembly temperature. Instead, the example temperature monitoring unit 602 compares only the wheel temperature to the predetermined threshold temperature to determine if an alert indicating the fuse plug 300 may melt is to be communicated. Thus, the example temperature monitoring unit 602 may detect if the fuse plug 300 is at risk of melting when the brake assembly 210 is cold (e.g., below the predetermined brake assembly temperature).

In some examples, if the temperature monitoring unit 602 determines that the wheel temperature peaks, the temperature monitoring unit 602 ceases to use the example table 700 to determine if an alert is to be communicated until a subsequent braking event is detected. A peak wheel temperature is a maximum wheel temperature resulting from a braking event. In some examples, once the wheel temperature peaks, the example temperature monitoring unit 602 compares only the wheel temperature to the predetermined threshold temperature to determine if the alert is to be communicated. If a braking event is subsequently detected, the example temperature monitoring unit 602 reverts back to employing the example table 700. Thus, the example temperature monitoring unit 602 may detect if the fuse plug 300 is at risk of melting after a braking event is completed. In some examples, the temperature monitoring unit 602 detects a braking event by determining that the wheel temperature and/or the brake assembly temperature is increasing.

In some examples, the temperature monitoring unit 602 determines if a temperature of the wheel 214 is a peak temperature of the wheel 214 by determining if the wheel temperature is increasing, decreasing or substantially constant at a first time. If the wheel temperature is increasing at the first time, the temperature monitoring unit 602 determines that the wheel temperature is below the peak wheel temperature. If the wheel temperature is decreasing at the first time, the temperature monitoring unit 602 determines that the wheel temperature is below the peak temperature. If the wheel temperature is substantially constant at the first time, the temperature monitoring unit 602 determines that that wheel temperature is the peak temperature.

In some examples, the alert is communicated until one or more conditions are met. Once the one or more conditions are met, the alert is removed. For example, the alert may be communicated until the temperature monitoring unit 602 determines that the wheel temperature is decreasing, the wheel temperature is below the predetermined threshold temperature by a predetermined amount, and the brake assembly temperature is below a predetermined brake assembly temperature. In other examples, the alert is removed if one or more different and/or additional conditions are met.

Figure 8:
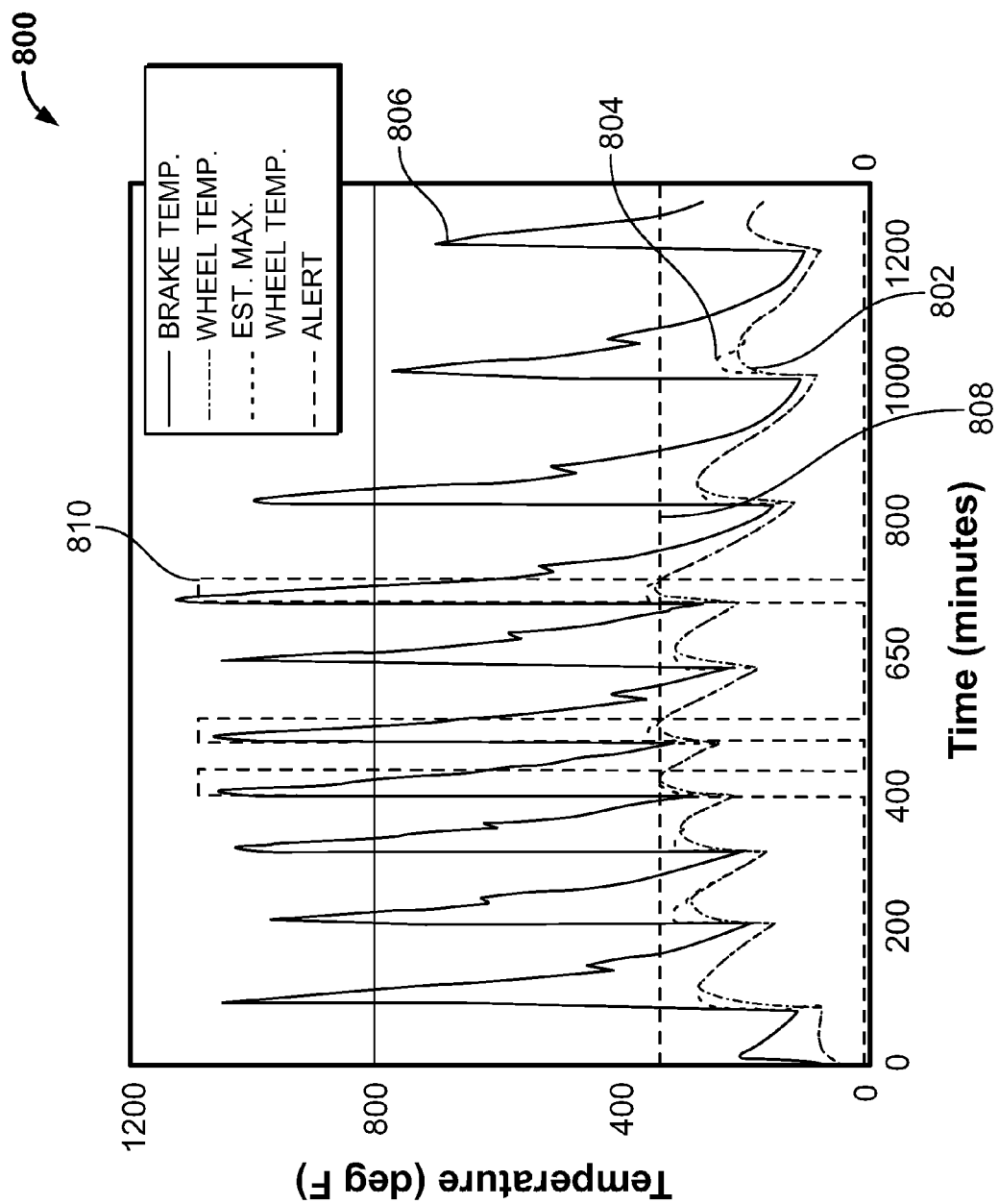
FIG. 8 is a graph illustrating wheel temperatures and brake assembly temperatures over a time period in which a plurality of braking events occurs.

FIG. 8 is graph 800 illustrating wheel temperatures and brake assembly temperatures over a time period in which a plurality of braking events occurred. In the illustrated example, a first line 802 represents wheel temperatures and a second line 804 represents estimated maximum wheel temperatures. The example graph 800 includes a third line 806 representative of brake assembly temperatures. An example fourth line 808 represents the predetermined threshold temperature, and an example fifth line 810 indicates if an alert is communicated to indicate that the fuse plug 300 is at risk of melting. As illustrated in the example graph 800 of FIG. 8, when the estimated maximum wheel temperature reaches or exceeds the predetermined threshold temperature, the alert is communicated. After the wheel temperature peaks and the wheel temperature and the brake temperature sufficiently decline (e.g., the wheel temperature is a less than the predetermined threshold temperature by a predetermined amount and the brake assembly temperature is less than the predetermined brake temperature), the alert is removed.

While an example manner of implementing the example fuse plug monitoring system 600 is illustrated in FIG. 6, one or more of the elements, processes and/or devices illustrated in FIG. 6 may be combined, divided, re-arranged, omitted, eliminated and/or implemented in any other way. Further, the example brake temperature sensor 222, the example wheel temperature sensor 500, the example temperature monitoring unit 602, the example aircraft control system 604, the example cockpit display 608, the example monitoring device 606, the example display 604 and/or, more generally, the fuse plug monitoring system 600 of FIG. 6 may be implemented by hardware, software, firmware and/or any combination of hardware, software and/or firmware. Thus, for example, any of the example brake temperature sensor 222, the example wheel temperature sensor 500, the example temperature monitoring unit 602, the example aircraft control system 604, the example cockpit display 608, the example monitoring device 606, the example display 604 and/or, more generally, the fuse plug monitoring system 600 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example brake temperature sensor 222, the example wheel temperature sensor 500, the example temperature monitoring unit 602, the example aircraft control system 604, the example cockpit display 608, the example monitoring device 606, the example display 604 and/or, more generally, the fuse plug monitoring system 600 of FIG. 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example fuse plug monitoring system 600 of FIG. 6 may include one or more elements, processes and/or devices in addition to, or instead of, those illustrated in FIG. 6, and/or may include more than one of any or all of the illustrated elements, processes and devices.

Figure 9:
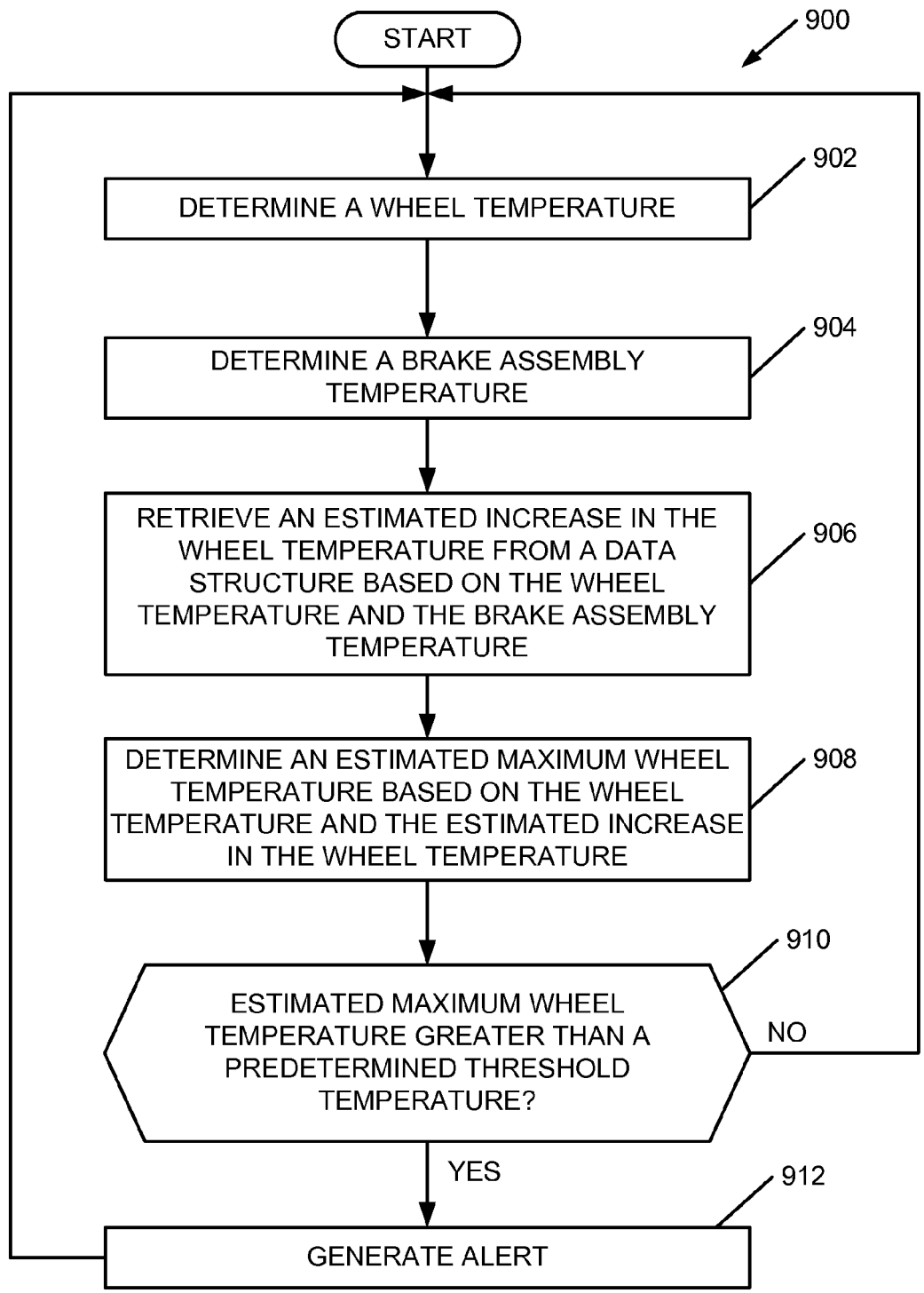
FIG. 9 is a flow diagram of an example method disclosed herein.
Figure 10:
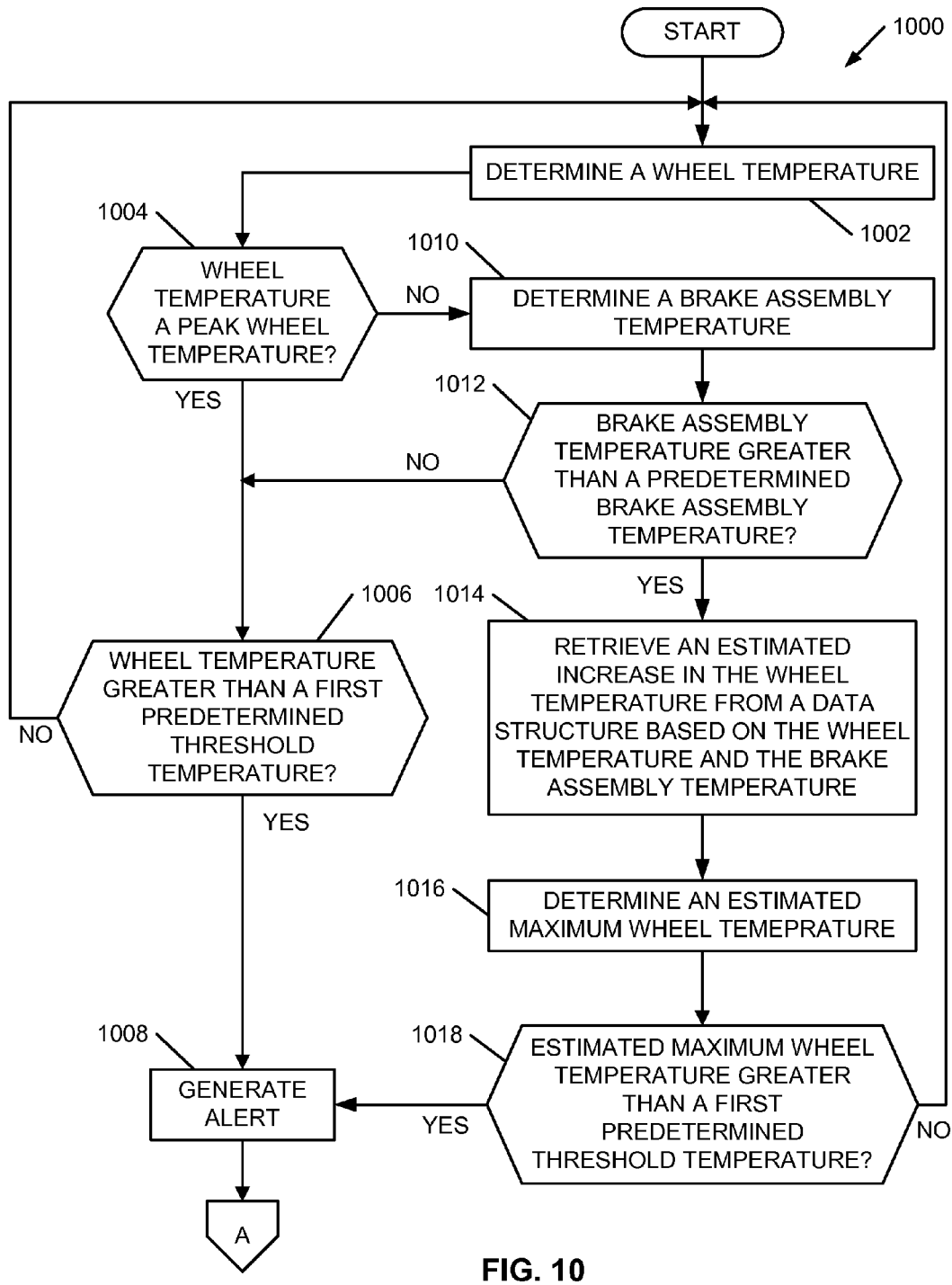
FIGS. 10-11 are flow diagrams of another example method disclosed herein.
Figure 11:
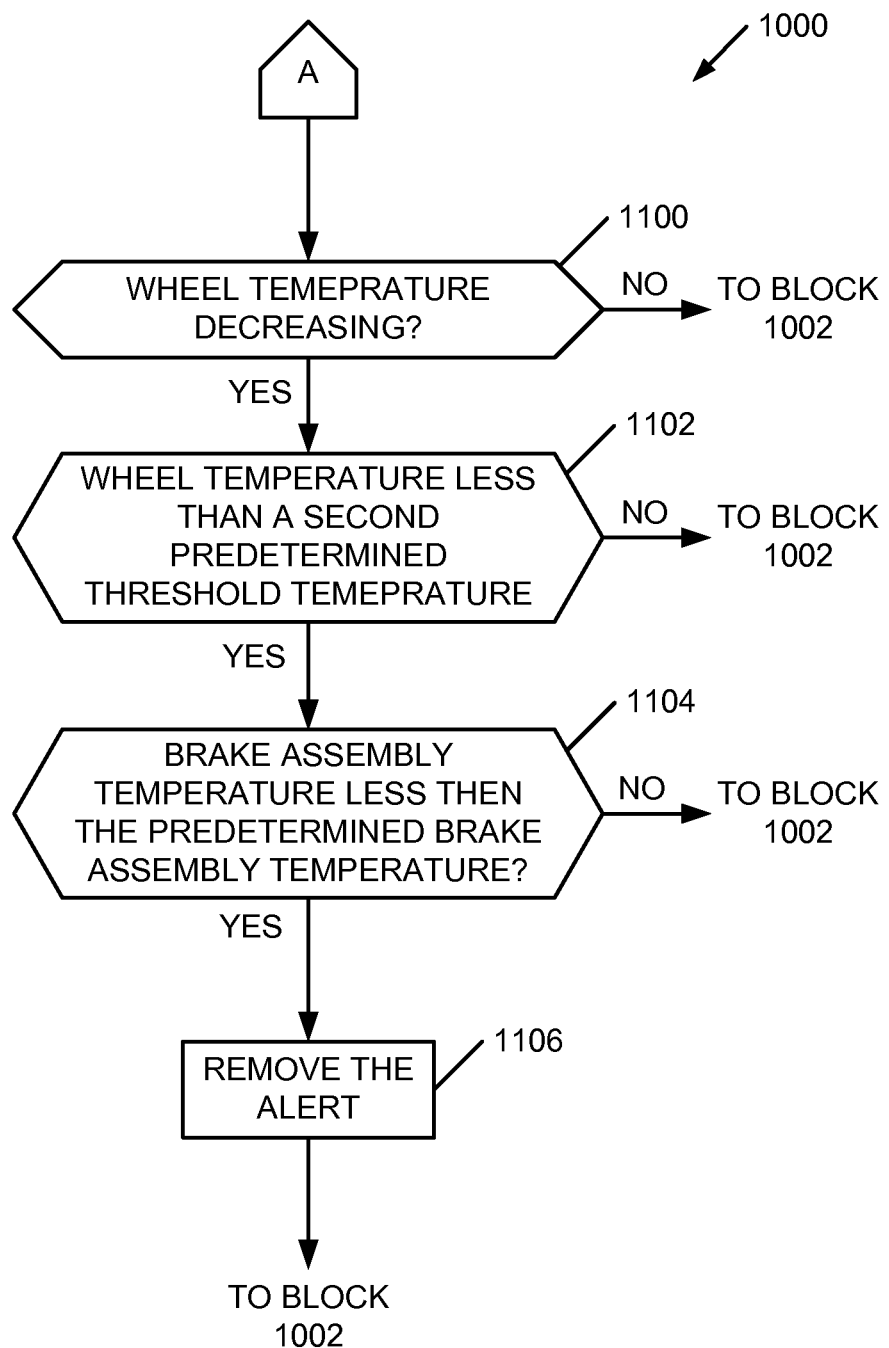

Flowcharts representative of example methods that may be used to implement the example temperature monitoring unit 602 of FIG. 6 are shown in FIGS. 9-11. The example methods may be implemented using machine readable instructions that comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example methods are described with reference to the flowcharts illustrated in FIGS. 9-11, many other methods of implementing the example temperature monitoring unit 602 may alternatively be used. For example, the order of execution of the blocks may be changed, and/or some of the blocks described may be changed, eliminated, or combined.

As mentioned above, the example methods of FIGS. 9-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 9-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIGS. 9-11 illustrate flowcharts representative example methods 900, 1000 that can be performed to monitor components of an aircraft landing system. The example methods 900, 1000 may be implemented using the example temperature monitoring unit 602 of FIG. 6. The example methods 900, 1000 may be initiated at predetermined intervals of time, substantially continuously, or in response to a detected event and/or a condition being met (e.g., touchdown from flight, conclusion of a braking event, operation of the brake assembly 210, a manual input, etc.). The example methods 900, 1000 may be performed while the aircraft 100 is supported on the surface 104 of Earth (e.g., parked, taxiing, etc.) and/or in flight.

The example method 900 of FIG. 9 begins by determining a wheel temperature (block 902). For example, the temperature monitoring unit 602 may determine the wheel temperature via the wheel temperature sensor 500. A brake assembly temperature is determined (block 904). For example, the temperature monitoring unit 602 may determine the brake assembly temperature via the brake temperature sensor 222.

The temperature monitoring unit 602 retrieves an estimated increase in the wheel temperature from a data structure based on the wheel temperature and the brake assembly temperature (block 906). For example, the temperature monitoring unit 602 may employ the example table 700 of FIG. 7 to retrieve the estimated increase in the wheel temperature. In some examples, the estimated wheel temperature increase is based on estimated heating patterns of the wheel 214 and/or the brake assembly 210.

The example temperature monitoring unit 602 determines an estimated maximum wheel temperature based on the wheel temperature and the estimated increase in the wheel temperature (block 908). In some examples, the temperature monitoring unit 602 adds the estimated wheel temperature increase to the wheel temperature to determine the estimated maximum wheel temperature. In some examples, the estimated maximum wheel temperature is a temperature at which the wheel 214 is estimated to reach at a future time such as, for example, approximately fifteen minutes after the wheel temperature is determined.

The temperature monitoring unit 602 determines if the estimated maximum wheel temperature is greater than a predetermined threshold temperature (block 910). In some examples, the predetermined threshold temperature is determined using Equation 1 above. If the estimated maximum wheel temperature is greater than the predetermined threshold temperature, an alert is generated (block 912). For example, a cockpit light may be illuminated. If the estimated maximum wheel temperature is not greater than the predetermined threshold temperature, the example method 900 returns to block 902.

FIG. 10 illustrates another example method 1000 disclosed herein. The example method of FIG. 10 begins by the temperature monitoring unit 602 determining a wheel temperature (block 1002). The temperature monitoring unit 602 determines if the wheel temperature is a peak wheel temperature (block 1004). In some examples, the temperature monitoring unit 602 determines if the wheel temperature is a peak wheel temperature by monitoring wheel temperatures over time and determining if the wheel temperature is increasing, decreasing, or substantially constant when the wheel temperature is determined at block 1002. If the wheel temperature is substantially constant (e.g., a rate of change of the wheel temperature is substantially zero) when the wheel temperature is determined, the temperature monitoring unit determines that the wheel temperature is the peak wheel temperature. If the wheel temperature is the peak wheel temperature, the temperature monitoring unit 602 determines if the wheel temperature is greater than a first predetermined threshold temperature (block 1006). In some examples, the first predetermined threshold temperature is determined using Equation 1 above. If the wheel temperature is greater than the first predetermined threshold temperature, an alert is generated (block 1008). In some example, the alert is generated by illuminating a light. By comparing the wheel temperature to the predetermined threshold temperature, the example temperature monitoring unit 602 may communicate alerts indicating that the fuse plug 300 is at risk of melting when the brake assembly 210 is cold and/or after a braking event has completed.

If the example temperature monitoring unit 602 determines that the wheel temperature is not a peak temperature, the temperature monitoring unit 602 determines a brake assembly temperature (block 1010). For example, the temperature monitoring unit 602 may determine the brake assembly temperature via the brake temperature sensor 222. In some examples, the temperature monitoring unit 602 determines the wheel temperature and the brake assembly temperature substantially contemporaneously.

The temperature monitoring unit 602 determines if the brake assembly temperature is greater than the predetermined brake assembly temperature (block 1012). In some examples, the predetermined brake assembly temperature is 500 degrees Fahrenheit. If the brake assembly temperature is not greater than the predetermined brake assembly temperature, the example method 1000 continues to block 1006 and the temperature monitoring unit compares only the wheel temperature to the first predetermined threshold temperature. In the illustrated example, if the brake assembly temperature is greater than the predetermined brake assembly temperature, the temperature monitoring unit 602 retrieves an estimated increase in the wheel temperature from a data structure based on the wheel temperature and the brake assembly temperature (block 1014). In some examples, the estimated increase in the wheel temperature is experimentally determined by, for example, monitoring wheel temperatures and/or brake assembly temperatures of one or more wheels similar or identical to the example wheel 214 during a plurality of braking events. In some examples, the temperature monitoring unit 602 employs the example table 700 of FIG. 7 and retrieves the estimated increase in wheel temperature by determining which one of a plurality of wheel temperature ranges and brake assembly temperature ranges include the wheel temperature and the brake assembly temperature, respectively.

The temperature monitoring unit 602 determines an estimated maximum wheel temperature (block 1016). In some examples, the temperature monitoring unit 602 determines the estimated maximum wheel temperature by adding the estimated increase in wheel temperature retrieved from the table 700 to the wheel temperature determined via the wheel temperature sensor 500. The example temperature monitoring unit 602 determines if the estimated maximum wheel temperature is greater than the first predetermined threshold temperature (block 1018). If the estimated maximum wheel temperature is greater than the first predetermined threshold temperature, an alert is generated (block 1008). If the estimated maximum wheel temperature is not greater than the first predetermined threshold temperature, the example method returns to block 1002.

Once the alert is generated, the example method 1000 continues to block 1100 of FIG. 11. In the illustrated example, the temperature monitoring unit 602 determines if the wheel temperature is decreasing (block 1100). If the wheel temperature is decreasing, the temperature monitoring unit 602 determines if the wheel temperature is less than a second predetermined threshold temperature (block 1102). In some examples, the second predetermined threshold temperature is less than the first predetermined threshold temperature. If the wheel temperature is less than the second predetermined threshold temperature, the temperature monitoring unit 602 determines if the brake assembly temperature is less than the predetermined brake assembly temperature (block 1104). If the brake assembly temperature is less than the predetermined brake assembly temperature, the alert is removed (block 1106), and the example method 1000 returns to block 1002. For example, the light may be unilluminated. If any of the conditions of block 1100, block 1102 or block 1104 are not met, the example method returns to block 1008 and, thus, the alert remains generated.

Figure 12:
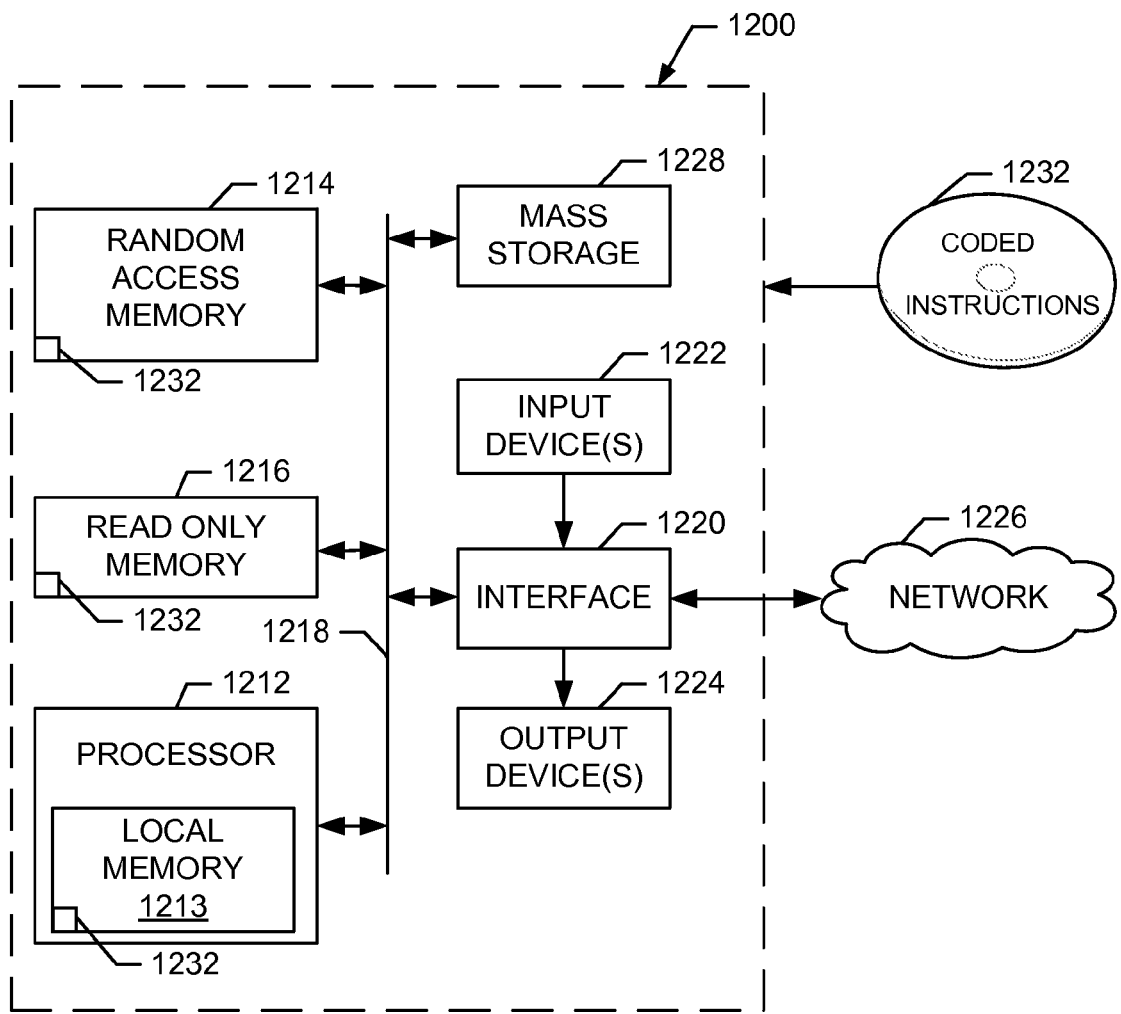
FIG. 12 is a block diagram of an example processing platform capable of executing machine readable instructions to implement the example temperature monitoring unit of FIG. 6.

FIG. 12 is a block diagram of an example processing platform 1200 capable of executing machine readable instructions to implement the temperature monitoring unit 602 of FIG. 6. The processing platform 1200 can be, for example, a server, a computer, a mobile device (e.g., a laptop, a smart phone, etc.), an Internet appliance, the aircraft control system 604, the monitoring device 606, or any other type of computing device.

The system 1200 of the instant example includes a processor 1212. For example, the processor 1212 can be implemented by one or more microprocessors or controllers from any desired family or manufacturer.

The processor 1212 includes a local memory 1213 (e.g., a cache) and is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processing platform 1200 also includes an interface circuit 1220. The interface circuit 1220 may be implemented by any type of interface standard, such as an Ethernet interface, a universal serial bus (USB), and/or a PCI express interface.

One or more input devices 1222 are connected to the interface circuit 1220. The input device(s) 1222 permit a user to enter data and commands into the processor 1212. The input device(s) can be implemented by, for example, a keyboard, a mouse, a touchscreen, a track-pad, a trackball, isopoint and/or a voice recognition system, a switch, a button, an aircraft cockpit console device, etc.

One or more output devices 1224 are also connected to the interface circuit 1220. The output devices 1224 can be implemented, for example, by display devices (e.g., a liquid crystal display, a cathode ray tube display (CRT), a printer and/or speakers). The interface circuit 1220, thus, typically includes a graphics driver card.

The interface circuit 1220 also includes a communication device such as a modem or network interface card to facilitate exchange of data with external computers via a network 1226 (e.g., an Ethernet connection, a digital subscriber line (DSL), a telephone line, coaxial cable, a cellular telephone system, a satellite communications system, etc.).

The processing platform 1200 also includes one or more mass storage devices 1228 for storing software and data. Examples of such mass storage devices 1228 include floppy disk drives, hard drive disks, compact disk drives and digital versatile disk (DVD) drives. The mass storage device 1228 may implement the local storage device 62.

Coded instructions 1232 that, when executed, cause a machine to perform the example methods 900, 1000 of FIGS. 9-11 may be stored in the mass storage device 1228, in the volatile memory 1214, in the non-volatile memory 1216, and/or on a removable storage medium such as a CD or DVD.

From the foregoing, it will be appreciated that the above-disclosed methods and apparatus may be used to monitor temperatures of a brake assembly and temperatures a wheel of an aircraft to determine estimated maximum temperatures of the wheel while the aircraft is parked, taxiing, in flight, landing and/or in any other state or phase of operation. Thus, during substantially all aspects of operation of the aircraft, the examples disclosed herein may determine if a fuse plug disposed on the wheel is at risk of melting by, for example, determining if the estimated maximum temperature of the wheel is exceeding or will exceed a predetermined threshold temperature. For example, the examples disclosed herein may determine if the fuse plug is at risk of melting before, during and after braking events, if the brake assembly and/or the wheel is cold, hot, increasing in temperature, at a substantially constant temperature, decreasing in temperature, and/or any in any other state and/or during any other aspect of operation. The examples disclosed herein take into account factors and/or conditions related to the brake assembly and/or the wheel such as, for example, an estimated melting temperature of the fuse plug, a position of the fuse plug relative to a wheel sensor, and/or other factors and/or conditions. The examples disclosed herein may also accurately and efficiently (e.g., in real-time) determine maximum temperatures of the wheel when the brake assembly is worn, substantially unworn, and/or in any other state of wear. Further, the examples disclosed herein employ techniques (e.g., retrieving estimated wheel temperature increases from a table, comparing the estimated maximum temperatures of the wheel to the predetermined threshold temperature, etc.) that do not employ complex calculations or algorithms.

If the fuse plug is at risk of melting, the examples disclosed herein generate an alert to alert or notify an operator of the aircraft, an aircraft control system and/or other systems and/or personnel. Thus, the examples disclosed herein enable the operator of an aircraft, the aircraft control system, etc. to accurately and efficiently determine when to schedule future braking events (e.g., landing at a destination) and/or perform one or more actions to cool the brake assembly and/or the wheel to prevent the fuse plug from melting. Thus, amounts of time scheduled between braking events may be substantially reduced or minimized relative to conventional systems that employ conventional BTMS systems.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method comprising:
    determining a first temperature of a wheel of an aircraft;
    determining a second temperature of a brake assembly operatively coupled to the wheel;
    associating the first temperature with one of a plurality of predetermined ranges of wheel temperatures;
    associating the second temperature with one of a plurality of predetermined ranges of brake assembly temperatures;
    determining an estimated increase in the first temperature associated with the one of the ranges of wheel temperatures and the one of the ranges of brake assembly temperatures; and
    determining a maximum temperature of the wheel based on the first temperature and the estimated increase in the first temperature.

2. The method of claim 1 further comprising determining if the maximum temperature is greater than a predetermined threshold temperature.

3. The method of claim 2 further comprising generating an alert if the maximum temperature is greater than the predetermined threshold temperature.

4. The method of claim 2, wherein the predetermined threshold temperature is less than a temperature at which a fuse plug of the wheel is to melt.

5. The method of claim 1, wherein determining the estimated increase in the first temperature comprises retrieving the estimated increase in the first temperature from a table.

6. The method of claim 1, wherein the estimated increase in the first temperature is based on experimentally determined heating patterns of one or more aircraft wheels.

7. A method, comprising:
    determining a brake assembly temperature;
    determining a wheel temperature;
    retrieving an estimated increase in the wheel temperature from a data structure based on the wheel temperature and the brake assembly temperature; and
    determining a maximum wheel temperature based on the wheel temperature and the estimated increase in the wheel temperature.

8. The method of claim 7, wherein retrieving the estimated increase in the wheel temperature comprises:
    determining which one of a plurality of wheel temperature ranges and which one of a plurality of brake assembly temperature ranges in the data structure include the wheel temperature and the brake assembly temperature, respectively; and
    retrieving the estimated increase in the wheel temperature associated with the one of the wheel temperature ranges and the one of the brake assembly temperature ranges.

9. The method of claim 7 further comprising:
    determining if the maximum wheel temperature is greater than a first predetermined threshold temperature; and
    generating an alert if the maximum wheel temperature is greater the first predetermined threshold temperature.

10. The method of claim 9 further comprising:
    monitoring the wheel temperature;
    monitoring the brake assembly temperature; and
    removing the alert if the wheel temperature decreases below a second predetermined threshold temperature and the brake assembly temperature is below a third predetermined threshold temperature.

11. The method of claim 7 further comprising:
    monitoring the wheel temperature;
    determining if the wheel temperature peaks;
    if the wheel temperature peaks, comparing only the wheel temperature to a first predetermined threshold temperature; and
    communicating an alert if the wheel temperature is greater than the first predetermined threshold temperature.

12. The method of claim 7, wherein determining the brake assembly temperature comprises determining the brake assembly temperature via a first temperature sensor disposed on a brake assembly operatively coupled to a wheel, and wherein determining the wheel temperature comprises determining the wheel temperature via a second temperature sensor disposed on the wheel.

13. A method, comprising:
    determining a brake assembly temperature;
    determining a wheel temperature; and
    determining if a fuse plug disposed on a wheel is at risk of melting based on the brake assembly temperature, the wheel temperature, and estimated heating patterns of the wheel.

14. The method of claim 13 wherein determining if the fuse plug is at risk of melting comprises:
    determining an estimated maximum temperature of the wheel based on the brake assembly temperature, the wheel temperature, and the estimated heating patterns; and
    determining if the estimated maximum temperature of the wheel is greater than a predetermined threshold temperature.

15. The method of claim 14, wherein determining the estimated maximum temperature of the wheel comprises retrieving an estimated increase in the wheel temperature from a data structure, wherein the estimated increase in the wheel temperature is determined based on one of the estimated heating patterns.

16. The method of claim 13, wherein determining if the fuse plug is at risk of melting comprises:
    comparing the brake assembly temperature to a predetermined brake assembly temperature; and
    comparing the wheel temperature to a predetermined threshold temperature if the brake assembly temperature is less than the predetermined brake assembly temperature.

17. The method of claim 13, wherein determining if the fuse plug is at risk of melting comprises:
    determining if the wheel temperature is a peak wheel temperature; and
    comparing the wheel temperature to a predetermined threshold temperature if the wheel temperature is the peak wheel temperature; and
    determining that the fuse plug is at risk of melting if the wheel temperature is greater than the predetermined threshold temperature.

18. The method of claim 13 further comprising generating an alert if the fuse plug is at risk of melting.

19. The method of claim 18 further comprising removing the alert if the wheel temperature is decreasing, the wheel temperature is below a first predetermined temperature, and the brake assembly temperature is below a second predetermined temperature.

20. The method of claim 13, wherein determining the brake assembly temperature comprises determining the brake assembly temperature via a first temperature sensor disposed on a brake assembly operatively coupled to the wheel, and wherein determining the wheel temperature comprises determining the wheel temperature via a second temperature sensor disposed on the wheel.

\* \* \* \* \*